United States Patent
Cetinkaya

(10) Patent No.: US 11,092,943 B1
(45) Date of Patent: Aug. 17, 2021

(54) METHOD, SYSTEM AND DEVICE FOR REAL-TIME IN-SITU ADDITIVE MANUFACTURING MONITORING

(71) Applicant: Cetin Cetinkaya, Potsdam, NY (US)

(72) Inventor: Cetin Cetinkaya, Potsdam, NY (US)

(*) Notice: Subject to any disclaimer, the term of this patent is extended or adjusted under 35 U.S.C. 154(b) by 713 days.

(21) Appl. No.: 15/731,366

(22) Filed: Jun. 1, 2017

(51) Int. Cl.
| | |
|---|---|
| *G05B 19/4099* | (2006.01) |
| *B33Y 50/02* | (2015.01) |
| *B33Y 10/00* | (2015.01) |
| *B22F 10/00* | (2021.01) |
| *B22F 10/10* | (2021.01) |

(52) U.S. Cl.
CPC ......... *G05B 19/4099* (2013.01); *B22F 10/00* (2021.01); *B33Y 50/02* (2014.12); *B22F 10/10* (2021.01); *B33Y 10/00* (2014.12)

(58) Field of Classification Search
CPC .... G05B 19/4099; B33Y 50/02; B33Y 10/00; B22F 3/1055; B22F 2003/1057
See application file for complete search history.

(56) References Cited

U.S. PATENT DOCUMENTS

| | | | |
|---|---|---|---|
| 9,989,495 B2* | 6/2018 | Gold | B33Y 50/00 |
| 10,562,288 B2* | 2/2020 | Lavrentyev | B23K 15/0086 |
| 10,744,598 B2* | 8/2020 | Hall | B29C 64/393 |
| 10,962,507 B2* | 3/2021 | Gold | B33Y 10/00 |
| 2007/0176312 A1* | 8/2007 | Clark | B23K 15/0086 264/40.1 |
| 2016/0184893 A1 | 6/2016 | Dave et al. | |
| 2016/0236414 A1 | 8/2016 | Reese et al. | |
| 2016/0339519 A1 | 11/2016 | Sargent | |
| 2017/0038342 A1 | 2/2017 | Clavette et al. | |
| 2017/0087634 A1 | 3/2017 | Beacham, Jr. et al. | |
| 2017/0284971 A1* | 10/2017 | Hall | G01B 1/00 |
| 2017/0312821 A1* | 11/2017 | DeFelice | B23K 26/0093 |

(Continued)

FOREIGN PATENT DOCUMENTS

JP 2019219179 A * 12/2019

OTHER PUBLICATIONS

Everton, Sarah K., et al. "Review of in-situ process monitoring and in-situ metrology for metal additive manufacturing", Materials & Design, 2016, pp. 431-445, vol. 95.

(Continued)

*Primary Examiner* — Roy Y Yi
*Assistant Examiner* — Geoffrey T Evans

(57) ABSTRACT

An in-process real-time method, system and device is provided for monitoring the quality of an article made by additive manufacturing processes. The invention involves the transmission and reception of waves into a test artifact while it is being built. The properties of received waves depend on the parameters of the additive manufacturing process, the properties of materials involved, and their irregularities as well as geometric deviations, as its structural periodicity and defects leads to the dispersion of waves. Based on the features of the artifact, the test artifact is designed to capture deviations in all or a sub-set of process, material, and geometric parameters. A computing device in communications with operators, the control unit of the additive manufacturing machine and other computing facilities is used for creating and analyzing waveforms. The disclosed system may initiate real-time actions based on the properties of the obtained waveforms.

10 Claims, 13 Drawing Sheets

(56) References Cited

U.S. PATENT DOCUMENTS

| | | | | |
|---|---|---|---|---|
| 2018/0101167 A1* | 4/2018 | DehghanNiri | .......... | B33Y 10/00 |
| 2018/0154484 A1* | 6/2018 | Hall | ..................... | B23K 26/034 |
| 2018/0162066 A1* | 6/2018 | Bruwer | .................. | B33Y 30/00 |
| 2018/0186082 A1* | 7/2018 | Randhawa | ............ | B23K 26/125 |
| 2019/0015901 A1* | 1/2019 | Haberland | ............. | B33Y 50/02 |

OTHER PUBLICATIONS

Grasso, Marco and B.M. Colosimo. "Process defects and In situ monitoring methods in metal powder bed fusion: a review", Measurement Science and Technology, 2017, vol. 28, issue 4.

Mani, Mahesh, et al., "Measurement science needs for real-time control of additive manufacturing powder bed fusion processes", NIST Interagency/Internal Report No. 8036, Gaithersburg, MD 2015.

Waller, Jess M., et al., Nondestructive Evaluation of Additive Manufacturing State-of-the-Discipline Report, NASA/TM-2014-218560, 2014.

AMSC Roadmap, America Makes & ANSI Additive Manufacturing Standardization Collaborative (AMSC), Final Draft dated Feb. 17, 2017, American National Standards Institute (ANSI)/National Center for Defense Manufacturing and Machining, 2017.

Standard Practice/Guide for Intentionally Seeding Replicates into Additively Manufactured (AM) Structures, ASTM, Work Item No. 56649, Draft Document, 2017.

Moylan, S. P., et al., A review of test artifacts for additive manufacturing, NIST Interagency/Internal Report (NISTIR)—7858, May 24, 2012.

Xu, Xiaochi, Chaitanya Krishna Prasad Vallabh, Ajay Krishnan, Scott Volk, and Cetin Cetinkaya. "In-Process Thread Orientation Monitoring in Additive Manufacturing." 3D Printing and Additive Manufacturing 6, No. 1 (2019): 21-30.

Xu, Xiaochi, Chaitanya Krishna Prasad Vallabh, Zachary James Cleland, and Cetin Cetinkaya. "Phononic crystal artifacts for real-time in situ quality monitoring in additive manufacturing." Journal of Manufacturing Science and Engineering 139, No. 9 (2017).

* cited by examiner

US 11,092,943 B1

METHOD, SYSTEM AND DEVICE FOR REAL-TIME IN-SITU ADDITIVE MANUFACTURING MONITORING

CROSS-REFERENCE TO PROVISIONAL APPLICATION

This nonprovisional patent application claims the benefit under 35 U.S.C. § 119(e) to U.S. Provisional Patent Application Ser. No. 62/392,469, filed on Jun. 2, 2016 by the present inventor, entitled "Method, System and Device for Additive Manufacturing Monitoring," by the present inventor and which is hereby incorporated by reference in its entirety.

TECHNICAL FIELD

The embodiments relate generally to additive manufacturing processes, and in particular to in-process real-time in-situ monitoring and quality assessments of additive manufacturing processes, machines and materials.

BACKGROUND—PRIOR ART

The following is a tabulation of some prior art that presently appears relevant:

Patent Citations

| Cited Patent | Filing date | Publication date | Applicant | Title |
|---|---|---|---|---|
| U.S. 20160184893 A1 | Aug. 21, 2015 | Jun. 30, 2016 | Sigma Labs, Inc. | Method and system for monitoring additive manufacturing processes |
| U.S. 20160339519 A1 | May 19, 2015 | Nov. 24, 2016 | Lockheed Martin Corporation | In-process monitoring of powder bed additive manufacturing |
| U.S. 20160236414 A1 | Feb. 12, 2015 | Aug. 18, 2016 | Arevo Inc. | Method to monitor additive manufacturing process for detection and in-situ correction of defects |
| U.S. 20170038342 A1 | Aug. 5, 2015 | Feb. 9, 2017 | Delavan Inc. | Systems for quality monitoring of additive manufacturing |
| U.S. 20170087634 A1 | Sep. 30, 2015 | Mar. 30, 2017 | General Electric Company | System and method for additive manufacturing process control |

Nonpatent Literature Documents

Everton, Sarah K., et al. "Review of in-situ process monitoring and in-situ metrology for metal additive manufacturing", Materials & Design, 2016, pp. 431-445, vol. 95.

Grasso, Marco and B. M. Colosimo. "Process defects and in situ monitoring methods in metal powder bed fusion: a review", Measurement Science and Technology, 2017, vol. 28, issue 4.

Mani, Mahesh, et al., "Measurement science needs for real-time control of additive manufacturing powder bed fusion processes", NIST Interagency/Internal Report No. 8036, Gaithersburg, Md., 2015.

Waller, Jess M., et al., Nondestructive Evaluation of Additive Manufacturing State-of-the-Discipline Report, NASA/TM-2014-218560, 2014.

AMSC ROADMAP, America Makes & ANSI Additive Manufacturing Standardization Collaborative (AMSC), FINAL DRAFT dated Feb. 17, 2017, American National Standards Institute (ANSI)/National Center for Defense Manufacturing and Machining, 2017.

Standard Practice/Guide for Intentionally Seeding Replicates into Additively Manufactured (AM) Structures, ASTM, Work Item Number: 56649, Draft Document, 2017.

Moylan, S. P., et al., A review of test artifacts for additive manufacturing, NIST Interagency/Internal Report (NISTIR)—7858, May 24, 2012.

Additive manufacturing (AM) and three-dimensional (3D) printing are names for a general class of manufacturing, in which a 3D article is made by the sequential build-up of layers of material or materials. One or more suitable AM techniques and materials may be utilized for making articles (e.g., such as by creating one or more patterns directly on a substrate). The AM approach usually includes a step of selectively depositing material layer by layer. Each layer is formed by lines of molten materials deposited with prescribed trajectories.

AM techniques, based on various processes (e.g., fused deposition modelling (FDM), powder bed fusion, material/binder jetting, and photopolymerisation), and materials (e.g., metals, polymers, glass, silica, and ceramics), provide a novel ability and flexibility for on-site (local) manufacture of intricate articles with meso-scale features from 10s microns ($\mu m$) to several millimeters (mm) and overall sizes up to meters-scale. Thus, it is dubbed a free-form method, implying that the complexity of a product is limited only by the resolution of its manufacturing machine. AM techniques are often attractive in that they avoid the need for manufacturing expertise, training, machining, mold making or tooling.

However, this level of article geometric complexity significantly increases the risk of quality compromises and poses unique and critical defect detection and qualification challenges, requiring specialized Non-Destructive Evaluation/Testing (NDE/NDT) approaches. Due to its line-tracing and layer-by-layer discrete production processes by creating and solidifying streaks of materials, significant variability in part quality in AM is often observed, thus in AM the development of novel inspection techniques for manufacturing quality assurance is necessary.

In AM-made articles, various types of defect have been observed: layer defects, zones with lack of fusion, isolated and clustered porosity, voids, residual stresses, and high-density inclusions/contaminations. In addition to such defects, microstructure that changes as a function of location may have a negative impact on NDE/NDT inspectability, and such effects need to be taken into account when selecting and validating appropriate inspection methods. While various post-processing techniques (e.g., stress relief, HIP, and heat treatment) have been proposed and utilized, many quality challenges remain.

The key common shortcomings of AM are often summarized as: (i) poor surface quality, (ii) low bonding quality and mechanical strength and layer delamination, (iii) limited material choices, (iv) significantly slow processes compared to some other manufacturing method such as forging, stamping, or molding techniques, (v) substantial residual stress build-up, (vi) inadequate dimensional tolerances and warpage (due to residual stresses), (vii) internal material defects and irregularities and uncontrolled porosity, (viii) limited process and production repeatability, and (ix) dimensional and form errors.

In filament fusion AM machines, the root causes of fabrication issues can often be traced to the mechanical/defect states of load-carrying fiber-to-fiber/layer-to-layer bonds. In case of Metal Laser Sintering, root causes of porosities, contaminations, micro-cracks, etc. are still under research and the disclosed method could help in diagnosis. If extensive post-production off-line quality inspections are required for complex articles, the on-site fabrication advantage offered by AM is no longer attractive.

Another quality-related shortcoming of AM is that it is difficult or impractical to inspect the article prior to completion. This situation may result in machine time and material waste, causing a substantial reduction in manufacturing throughput and profitability.

After an article is completely manufactured, using current NDE/NDT techniques, it may be difficult or impossible to inspect the article due to the geometric complexity and uneven materials and properties distributions in an article. Thus, an article may have a latent defect that is undetected in a post-manufacturing quality evaluation and may be installed on a machine only to subsequently fail, leading losses.

While process control could limit such variability, its effectiveness is often impeded by a lack of adequate process understanding and measurement techniques. Consequently, current process control is frequently based on heuristics, human experience and experimental data, yielding limited improvements in quality output. AM lacks in-situ quality inspection capability, which seriously limits the realization of its full potential as a practical on-site manufacturing modality. Currently its widespread industrial adoption in critical applications is often challenged by quality and consistency concerns. If extensive post-production off-line quality inspections are required for a complex article, the on-site fabrication advantage that AM offers is no longer attractive. Moreover, virtually all existing standard NDE/NDT techniques today are of limited values to additive manufacturing, as they are developed for relatively simple geometries and waveguides (e.g., plates, disks, pipes, etc.), as irregular boundaries pose serious detection difficulties for NDE/NDT techniques based on wave propagation.

There also remains a need for system that provides real-time automatic alteration of processing conditions based on monitoring information about the layer manufacturing of a 3D article, leading to an independent close-loop system. Such a system would have the potential to allow for reduction in the complexity and overall size of the AM machine.

As detailed in a series of recent review articles by Everton et al. and Grasso and Colosimo, and technology reports by Mani et al. of NIST (the National Institute of Standards and Technology) and Waller et al. of NASA (the National Aeronautics and Space Administration) on in-situ process monitoring, currently quality issues form a serious roadblock for high-value products and its wide-scale adoption. In addition, various standard and roadmap development efforts are reported (for example, see AMSC (the Additive Manufacturing Standardization Collaborative) Roadmap and ASTM (the American Society for Testing Materials) Work Item (Number 56649)). In the AMSC Roadmap, various aspects of the disclosed method, system and device have clearly been identified as technology gaps.

At present, there exist methods and systems for monitoring and assessing AM processes that are based on the utilization of test artifacts. Manufacturing a test artifact enables a composite test since most of the errors present in the materials, AM machine, and processes contribute to the errors in the final product. Several test artifacts for formal standardization have been proposed and utilized, as summarized and discussed in a NIST report by Moylan et al. With such a well-designed standardized artifact, the performances of different machines and processes, or materials that produce the same standardized artifact may be compared.

However, presently, the ultimate function of available a test artifact is limited to test the ability of an AM machine in its reproducing geometric features, not necessarily other critical properties such as mechanical strength, structural integrity, internal defect types and states, and optical and electromagnetic properties, and their spatial distributions. Thus, its utilization is limited.

SUMMARY

The present invention seeks to improve upon prior test artifact-based quality monitoring methods for AM processes and by providing a unique method, system and device for inspection of articles utilizing a novel class of test artifacts with periodic internal structures, which are to be built in an AM machine while its progress is monitored with aid of waves.

As the following discussion will illustrate, the present teachings relate to method, system and device for performing real-time in-situ inspection and quality monitoring of a 3D test artifact comprising a number of disclosed steps.

In an embodiment, a design method of the test artifact is provided. The spectral characteristics of waves propagating in the interior of the artifact are altered by the mechanical, physical and geometric properties of its propagation medium. Consequently, the analysis of spectral response of the artifact has potential to reveal information about both its internal structures and the properties of materials. However, the spectral analysis of complex geometries and its direct application offers limited insight, thus special care needs to be taken in designing test artifacts. It is known that a periodic structure can disperse waves and create pass and stop bands in its frequency spectrum depending on its geometric arrangement, interfacial properties, and mass distribution as well as defect states even if materials involved not necessarily include any imperfections and/or dissipation mechanisms. In addition, even small perturbation level defects in a periodic structure may have significant observable effects in its spectral response, thus can be detected from the properties of received waves.

In another embodiment, a real-time in-situ monitoring method, utilizing the spectral (dispersive) characteristics of wave propagation in a specially designed phononic test artifact consisting of repeating sub-structures is disclosed.

For example, it may be utilized to monitor and assess the fiber-to-fiber bond quality—not only for geometry, but also for mechanical strength and physical defects.

As detecting waves travel significantly faster than typical AM deposition speeds, the disclosed approach may lead to rapid real-time monitoring with no or minimal interactions with fusion process. Currently, at process control, monitoring, and inspection levels, probing knowledge required to implement such an approach is generally absent. The disclosed invention provides a method, system and device for this unfulfilled real-time in-situ monitoring need.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying figures, in which like reference numerals refer to identical or functionally-similar elements throughout the separate views and which are incorporated in and form an article of the specification, further illustrate the present invention, and together with the detailed description of the invention, serve to explain the principles of the present invention. So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
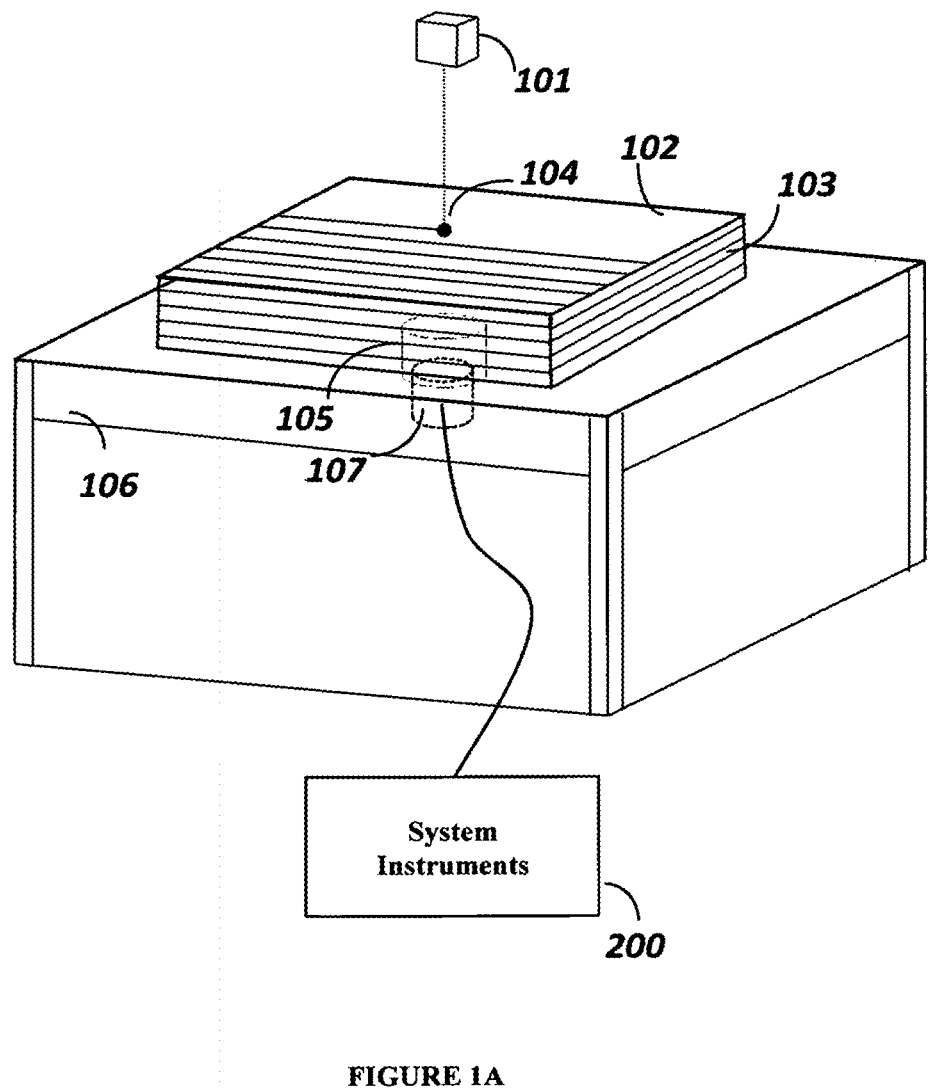
FIG. 1A is a diagram of the overall system.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to fused deposition modelling (FDM) with a filament made of the material of Poly(lactic acid) (PSL) and phononic test artifacts made by FDM, embodiments of the invention are also applicable to sintering and to other additive manufacturing processes and techniques and test artifacts made by those processes and techniques. Although exemplary embodiments of the described artifacts are in the shapes of cube and cuboid, embodiments of the invention are also makeable with other geometric shapes. Moreover, embodiments of the invention are not limited to industrial applications and may be generally useful for AM and 3D printing. In addition to FDM, particular embodiments may be suitable for use with Selective Laser Melting (SLM), Direct Metal Laser Melt (DMLM) and Direct Metal Laser Sintering (DMLS) additive manufacturing techniques.

These and other embodiments are discussed below with reference to FIGS. 1-8; however, those skilled in the art will readily appreciate that the detailed description given herein with respect to these figures is for explanatory purposes only and should not be construed as limiting.

The flowchart discussed herein is necessarily discussed in some sequence for purposes of illustration, but unless otherwise explicitly indicated, the embodiments are not limited to any particular sequence of steps.

Figure 1B:
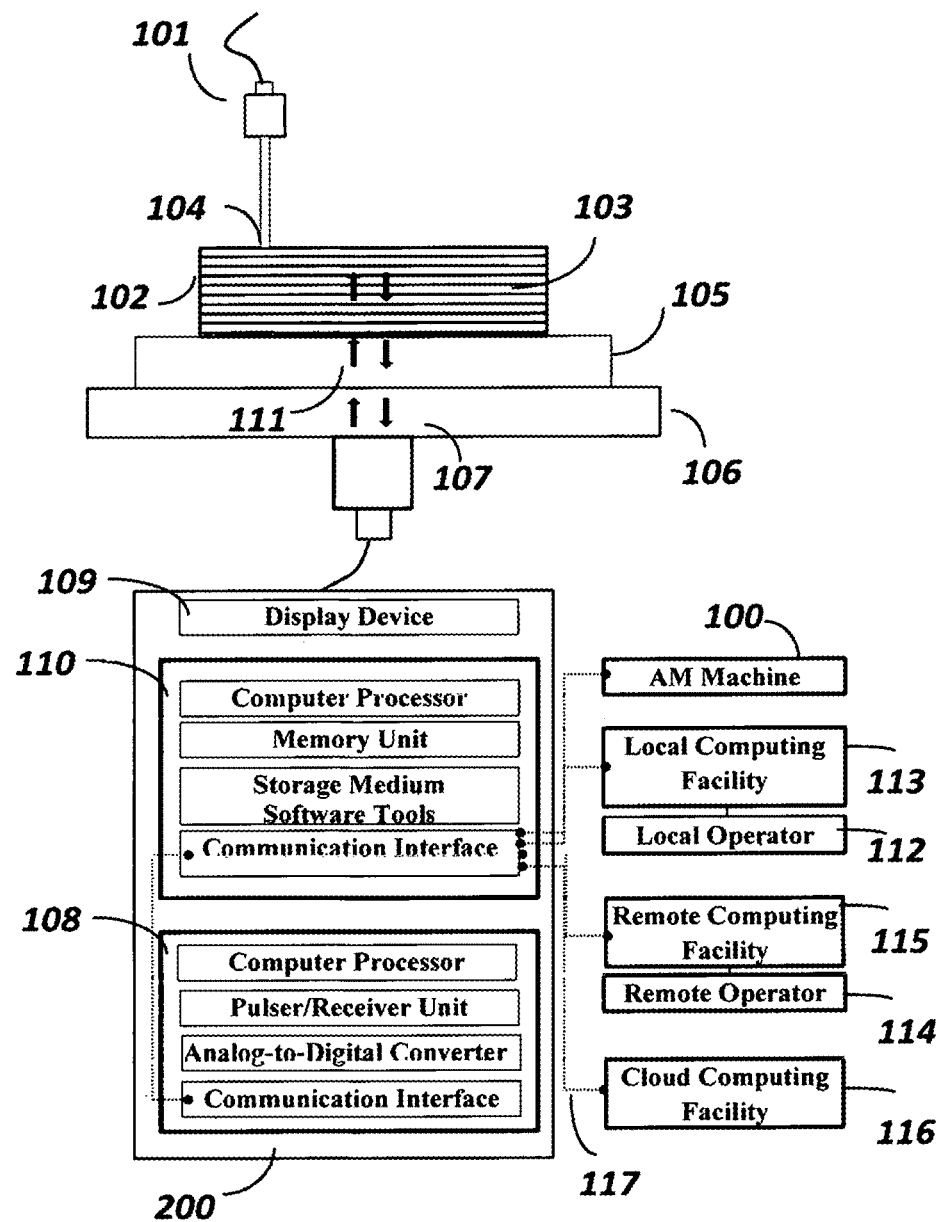
FIG. 1B is a side view diagram of the system components, according to one embodiment.

With reference to FIG. 1A and FIG. 1B, a system for inspecting an additive manufacturing system in making a specific article according to a preferred embodiment of the present invention is illustrated. In an embodiment, the additive manufacturing system 100 may be an FDM additive manufacturing system of the type known in the art. For example, the additive manufacturing system may include a process chamber with a build plate. Located in the process chamber, in the area of the build-up chamber, is a scanning device that directs a deposition head 101, softening, melting and depositing activated material 104 on the build plate 106. Material is energetically activated for re-shaping and bonding. The deposition head 101, the scanning device, as well as a drive mechanism are typically electrically connected to the control unit of an additive manufacturing machine 100. The activated material 104 is provided by a source that is located in the additive manufacturing machine 100.

The system instruments 200 drive a transducer 105, as shown in FIG. 1B for an embodiment. To manufacture a test artifact 102 on its delay line 105 mounted on the build plate 106 of the additive manufacturing machine, for example, the test artifact coordinates are first entered three-dimensionally, that is, in individual z-direction divided cuts, into the processing unit of the additive manufacturing machine 100. In an embodiment, the input unit for artifact data may be a computing device 110. In an embodiment, the input unit for artifact data may be a local computing facility 113. In an embodiment, the input unit for artifact data may be a remote computing facility 115. In an embodiment, the input unit for artifact data may be a Cloud-based computing facility 116. In an embodiment, the computing device, the local computing facility, the remote computing facility, and the Cloud-based computing facility are capable of accessing to the Internet by wired and/or wireless means. Cloud-based computing is a type of Internet-based computing that provides shared computer processing software resources and data to computers and other computing devices on demand.

Figure 2A:
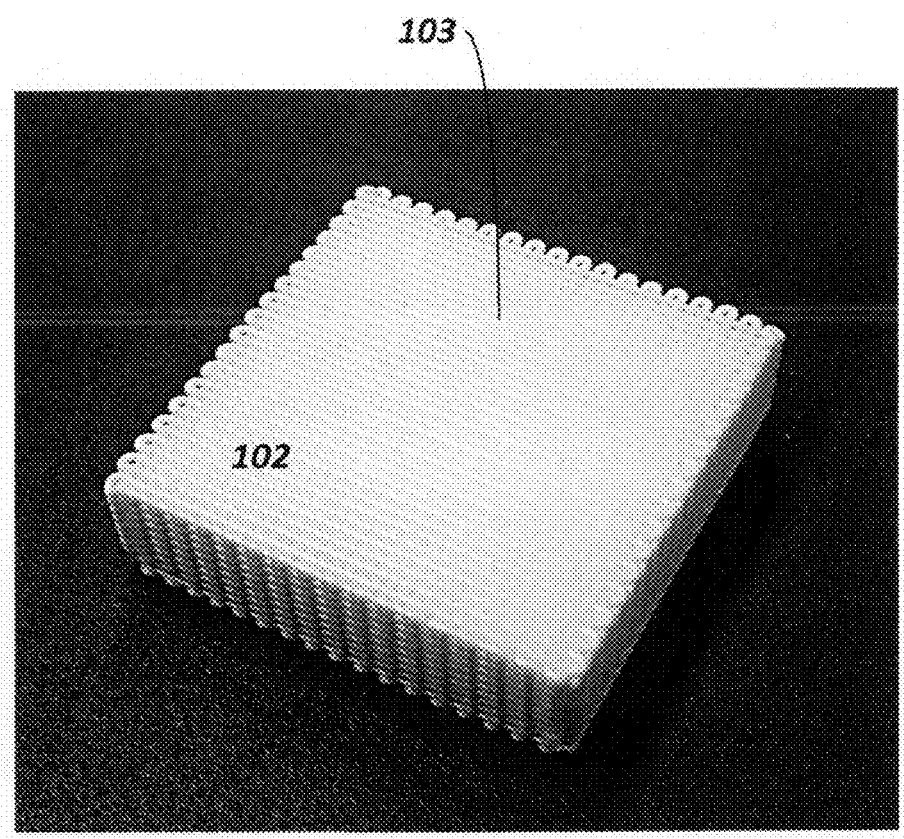
FIG. 2A is the photograph of a 3D printed test artifact consisting of repeating grid sub-structures made of polymer material, according to one embodiment.
Figure 2B:
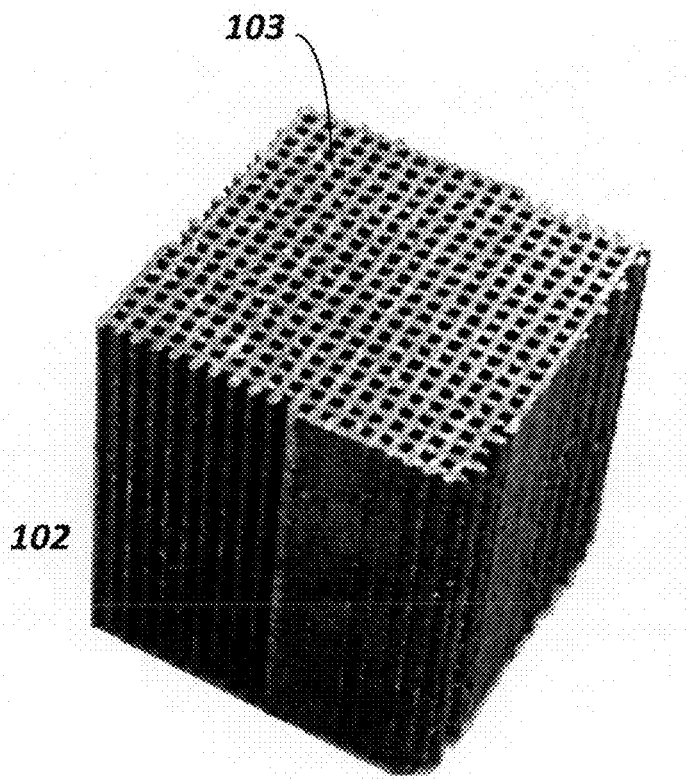
FIG. 2B is the photograph of a 3D printed test artifact consisting of repeating channels made of metal material, according to one embodiment.

A test artifact 102 with periodic internal structures 103 is used to predict the quality of an article made with an AM machine 100. A carefully designed test artifact enables a composite test for the article. In general, the geometry and internal structures of a test artifact is simpler than those of an article for which the test artifact is designed to verify and validate. In an embodiment, the disclosed process uses a test artifact with an internal structure to study only the strength of fiber-to-fiber bonds by isolating the process from other geometric and process complexities is utilized. The periodic structure utilized for the internal features of a test artifact is designed with aid of a CAD (Computer-Aided Design) software product as a high-porosity rectangular prism with a regular orthogonal fiber placement arrangement, as depicted in FIG. 2A. The output of the design process is a digital model representation file that is processed to obtain a set of instructions stored in a layer-by-layer geometric representation (GR) file. A GR file is processed by an AM machine to build an object, such as a test artifact or an article. One common format for GR files is g-code. However, in one embodiment, the geometry of a test artifact may be other than cube and cuboid.

In one embodiment, manufacturing materials may be arranged in arrangements other than orthogonal fiber placement arrangement. The geometric design represented as a digital (solid) model representation file and often saved in Stereolithography (STL) file format. This file is imported into a 3D printing slicing software product for creating desired periodic internal structures 103, in the file format of a Numerical Control (NC) programming language RS-274 (also referred to as G programming language). Its file format is g-code. The design of a test artifact is generated by a computer flow chart, given in FIG. 8, developed for mimicking the critical geometric features of an article for which the test artifact here is used for the quality assessment of the article. In an embodiment, defects that are predicted or expected the article could experience during manufacturing may be translated into the design of a test artifact.

In one embodiment, the test artifact placed on the surface of a delay line 105 that is built on the build plate 106 of the AM machine 100, along the side of an article. A transducer 107 is mounted on the bottom of the build plate. Transducer 107 is a device that converts variations in a physical quantity, such as elastic waves, brightness or electromagnetic waves, into an electrical signal, or vice versa. In one embedment, the transducer is for elastic waves. In another embedment, the transducer is for electromagnetic waves. In another embedment, the transducer is for light waves. The center of the test artifact is aligned with the center of the transducer. In another embedment, the surface of a transducer may be used as a build plate for the test artifact, eliminating the transmission of waves through the build plate of the additive manufacturing machine. In another embodiment, a test artifact is built and inspected prior to the initiation of building an article. In another embodiment, a test artifact is built simultaneously with an article, allowing the control unit of the additive manufacturing machines to make real-time adjustment to its process parameters and the article representation data file according to a set of pre-determined monitoring objectives. In another embodiment, a delay line may be printed by the additive manufacturing machine directly on the transducer surface as part of the test artifact print job. In another embodiment, the transducer, delay line and test artifact may be printed by the additive manufacturing machine as a single print job. In another embodiment, the transducer, delay line and test artifact may be printed by the additive manufacturing machine as a single print job on an article.

FIG. 1B is a side view diagram of the system components, according to one preferred embodiment. Waves 111 with a particular bandwidth of 0.72-2.3 MHz are initiated by an electrical pulse generated by a pulser/received unit 108, which is controlled by a computing device 110. In one embodiment, waves reflected and scattered from the geometric features and material distribution in the test artifact are sensed by the same transducer 107. A waveform corresponding to the waves 111 coming from the test artifact is digitized in a device connected to the computing device 110 of the monitoring system 200. The received waveform in digital form is stored in the storage medium of the computing device 110.

The computing device 110 may be linked to one or more of the following: a local computing facility 113, a remote computing facility 115 and a cloud based computing facility 116. A communication link 117 is utilized connecting the computing device of the monitoring system 200 to each available computing facility. In one embodiment, a communication link 117 between the computing device 100 and a computing facility may be wireless. The local computing facility 113 is monitored and managed by a local operator 112 on the site of the AM machine, thus called local. The remote computing facility 115 is monitored and managed by a remote operator 114. According to one embodiment, each computing facility consists of a computational processor, a memory unit, a communication interface that is in the constant communication with each other, the computational facility of the AM machine and the computing device 110.

In one preferred embodiment, a test artifact with a grid periodic structure 103 for extracting the effect of print speed on the spectral properties of received waveforms 111 is presented in FIG. 2A. According to another embodiment in FIG. 2B, a metal test artifact may be built.

Figure 3A:
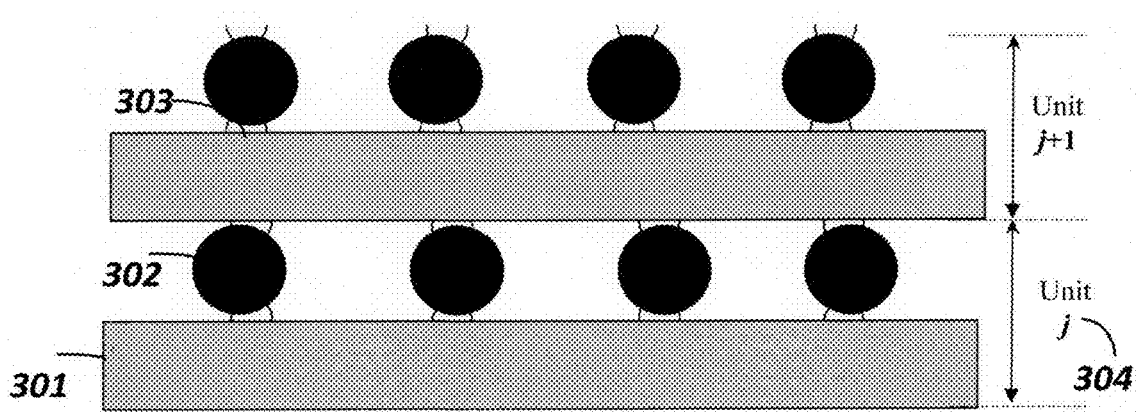
FIG. 3A is a side view diagram of an embodiment of a test artifact with a regular periodic internal structure, according to one embodiment.

In FIG. 3A, the cross-section image showing the placements of in-plane fibers 301 and out-of-plane fiber 302 that are bonded by bonding zones 303 is presented. A set consisting of one in-plane fiber layer and one out-of-plane fiber layer form a repeating periodic set j 304. In FIG. 3D, an optical image of an artifact is depicted with a grid representing the intended fiber placement pattern 305 to illustrate the extent of print error, according to one embodiment. In one embodiment, the geometry of a test artifact may other than cube and cuboid. In one embodiment, manufacturing material arrangements may be other than orthogonal fiber placement arrangements.

Figure 4A:
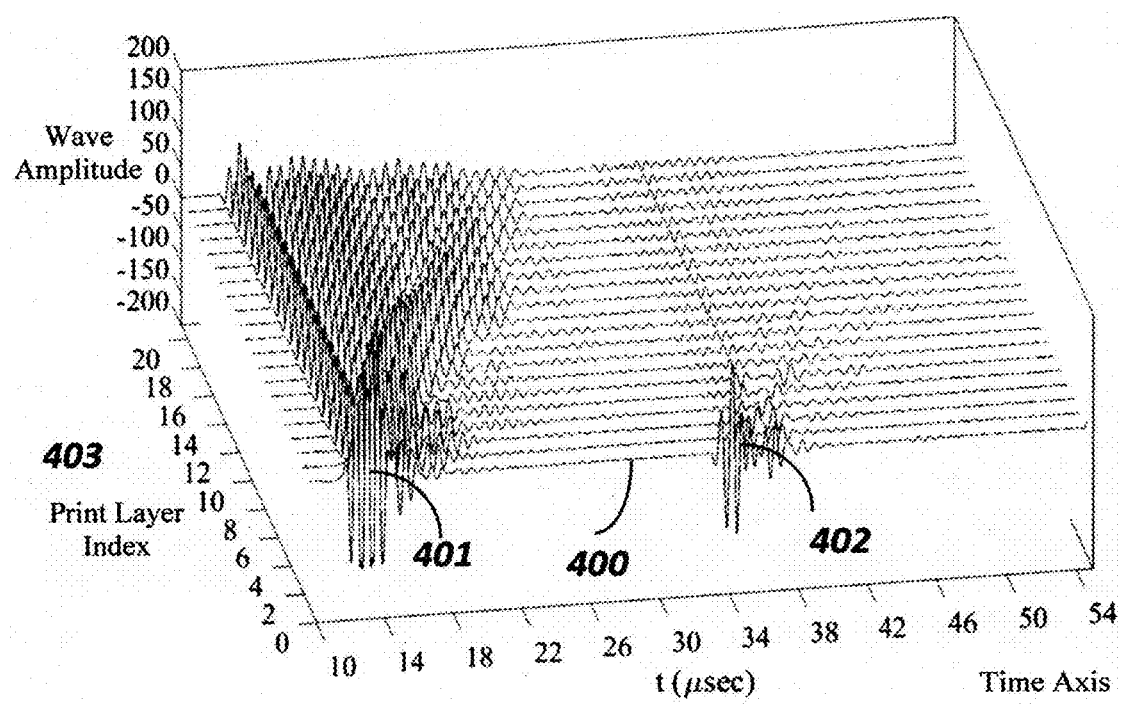
FIG. 4A is the waterfall plot of the ensembles of the waveforms acquired real-time at the pulser voltage of 200 V for all 20 of its the print layers in the time interval of t=10-55 μs, including the elastic wave response (z-axis) of the delay-line and the sample for each print layer (y-axis) in the temporal domain (x-axis) at a print speed of $v_p$=33 mm/sec, according to one embodiment.
Figure 4B:
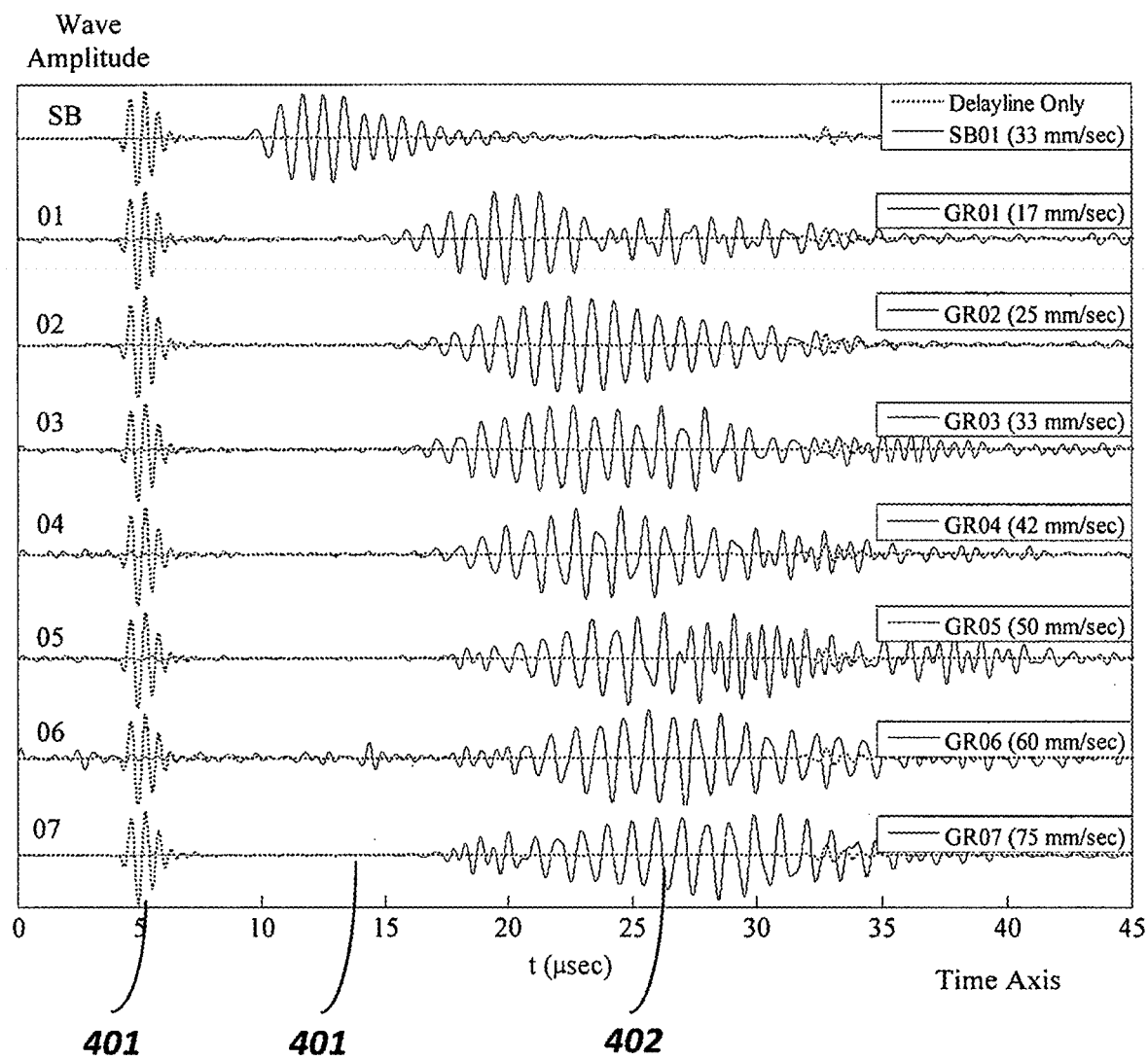
FIG. 4B is a plot of the cascaded waveforms at the pulser voltage of 200V for a set of test artifacts (named GR01-07) made at seven different print speeds according to one embodiment.

In FIG. 4.A, waveforms consisting of a main bang 401 and arrival wave 402 obtained for each periodic set is depicted. Waveforms acquired for the first layer at various extrusion speed levels ($v_p$=17, 25, 33, 42, 50, 60, 75 m/s) for the test sample set, GR01-07, according to one embodiment, and 33 mm/sec for a solid sample made of the same materials with 100% fill ratio (SB01), respectively, are depicted in FIG. 4B. In this preferred embodiment, the print speed is the only process parameter which is varied, and all other AM process and materials are kept constant during manufacturing.

In FIG. 4A, in one preferred embodiment, the real-time acquired temporal waveforms may be employed to visually examine the potential relationship between the time-of-flight (ToF), print layer number and attenuation of the ultrasonic pulse. The expected round-trip ToF (RToFs) for each printed sample are estimated from the offline measurements. The pulse-echo mode results in RToF is twice the ToF measured in the pitch-catch mode. The RToF of each sample was are to shift right with the increase in the print layer.

In FIG. 4A, the reflection of print layer interface shifted right with the increase in print layer. The increasing trend of the RToF corresponds to the increase in the thickness of the sample. The pulse signal attenuates when transmitted through the phononic structure due to its periodic structure with geometric and mechanical variations and defects of bonds and fibers.

In FIG. 4A, the temporal response waveforms for each level of the set extrusion speed ($v_P$) are depicted. Processing the acquired waveforms, ToFs provide the pressure wave velocity in a sample by $c_L$=h/Δt where h is the sample thickness at the time of print.

Figure 5:
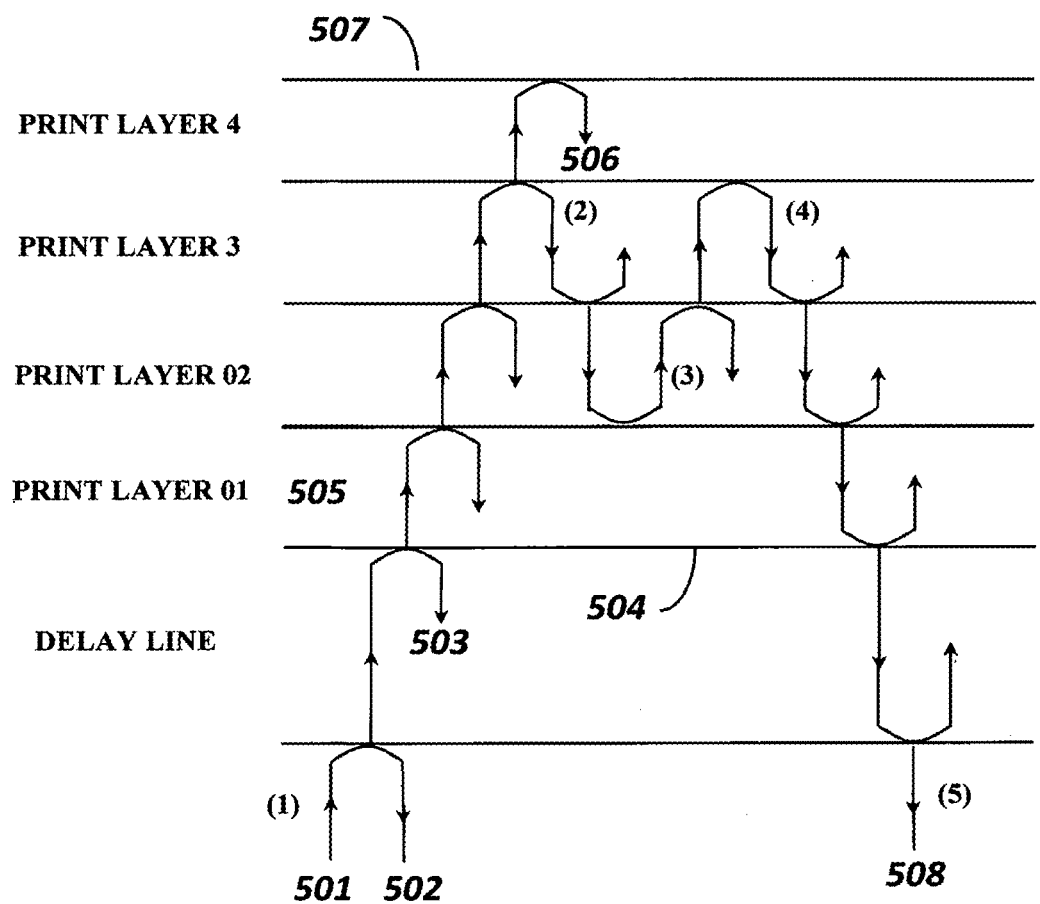
FIG. 5 is a ray-tracing diagram of the transmitted and reflected waves in a four-layer test artifact, according to one embodiment.

In FIG. 5, a ray tracing diagram is presented, showing an initial pulse 501 generated by the transducer and its propagation into a periodic test artifact. The delayline reflection 502, reflected waves 503 from the interface 504 of the first layer 505, and the reflected waves 506 from the free-surface 507. The transducer captures a waveform 508 that is composite of several reflections in the test artifact. Reflection properties and subsequent wave dispersion depend on the stiffness of fiber material connected to each other, the coupling properties of fiber-fiber bonds 303, and imperfections and defects in processes, materials and the shapes of bonding zones. As predicted from the wave propagation principles in periodic structure, these effects express themselves in the spectral representations of acquired waveforms, as shown in FIGS. 4A and 4B.

Figure 6A:
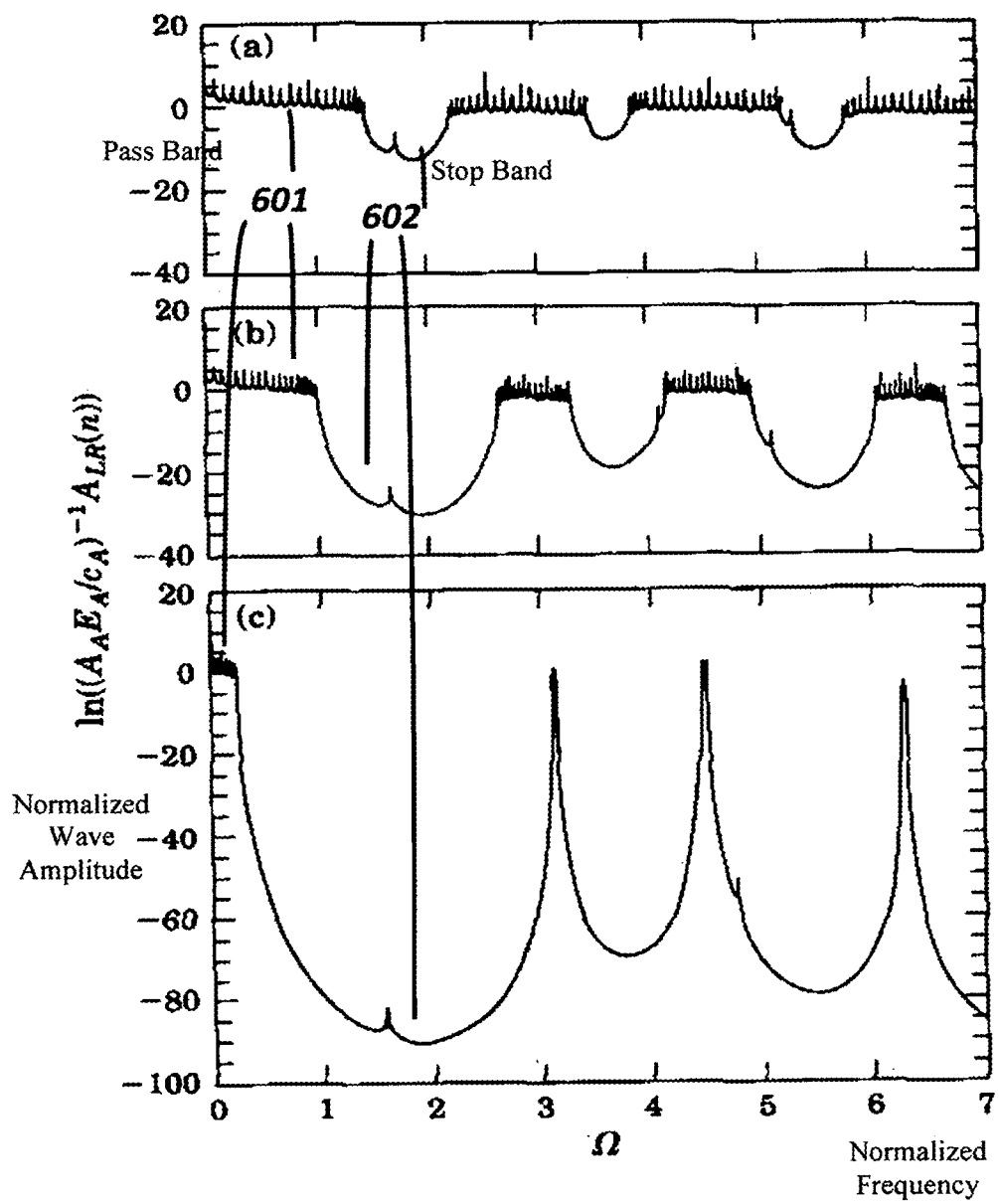
FIG. 6A is a plot of the cascaded spectral responses of three weakly coupled bi-layer periodic structures indicating their pass and stop bands (with decreasing layer-to-layer elastic coupling), included as an illustration of the effect of structural periodicity and properties on spectral responses, according to one embodiment.
Figure 6B:
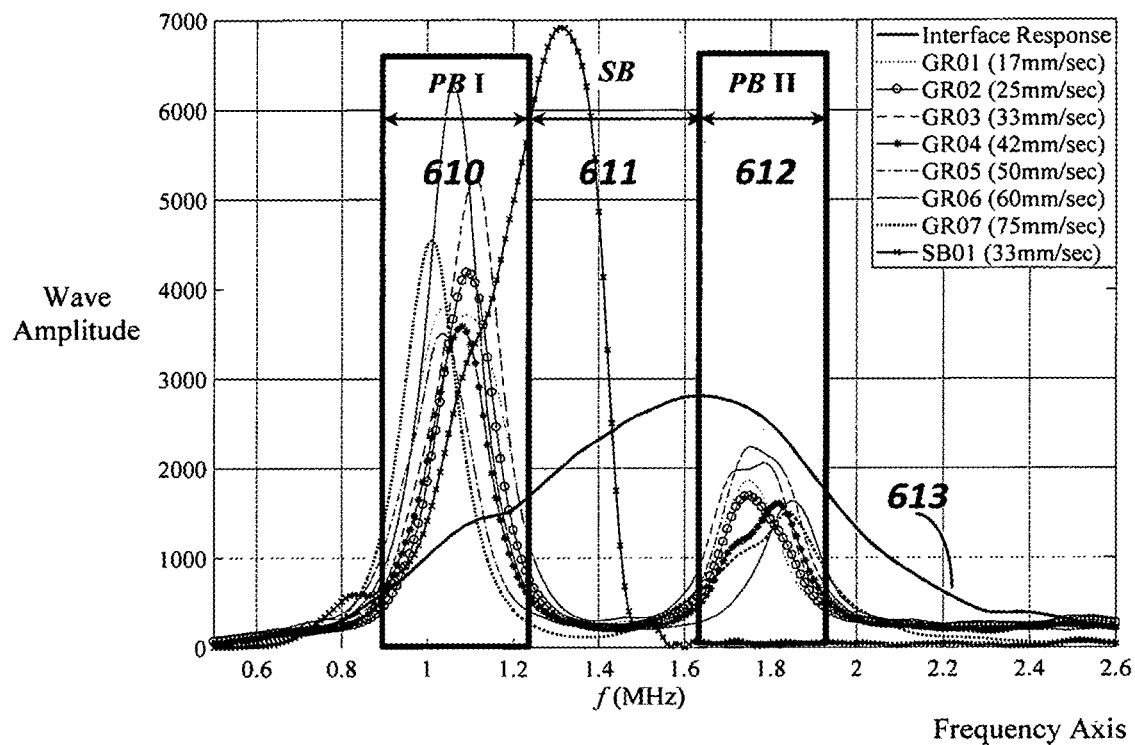
FIG. 6B is a plot of the superimposed spectral responses of GR01-07, indicating the boundaries of the stop (SB) and pass (PB) bands in the transducer bandwidth, according to one embodiment.

According to one preferred embodiment, the temporal responses for a sample set and the solid reference are transformed into its spectral domain by employing the Fast Fourier Transform (FFT) routine, as depicted in FIG. 6B. According to one embodiment, the transducer bandwidth (0.72-2.3 MHz) is visible from the spectral response of the delay-line interface. In FIG. 6B, two pass bands (PBs) (610 and 612) and a stop band (SBs) (611) in the transducer bandwidth 613 are formed, indicating the clear effect of the test artifact.

In FIG. 6A, for teaching those skilled in the art, a plot of the cascaded spectral responses of weakly coupled bi-layer periodic structures indicating their pass bands 601 and stop bands 602 is presented. Elastic wave components with frequency contents in a stop band 602 are highly attenuated. The amplitudes of other wave components in a pass band 601 are reduced by an insertion loss factor, but travel with no further attenuation.

According to one embodiment, in FIG. 6B, the waveforms in spectral domain are superimposed along with the bandwidth 613 of the transducer. The formation of stop band 611 between two pass bands 610 and 612 is shown, and the effect of the extrusion speed on the bounds of the stop band is apparent. With increasing the extrusion speed, the bounds of stop band are enlarged, thus it may be monitored in one embodiment.

According to one preferred embodiment, the bandwidth of the transducers used in the experiments (0.72-2.3 MHz) is chosen, such a way that the wavelengths of ultrasonic pulses travelling in the test artifacts are comparable to the 3D line spacing of 400 μm. In the close-up image of the longitudinal cross-sections of GR01, as shown in FIG. 4D, it is visible how fiber junctions are embedded into adjacent fibers forming the print layers as they solidified, and resulting printing errors and sub-structure deformations. By analyzing the close-up microstructures of GR01-07, the average thickness of a fiber (301 and 302), the average intra-layer fiber-to-fiber spacing and the average print layer height are evaluated. The average actual print layer heights decrease with the increasing extrusion speed whereas, the average spacing of adjacent print fibers and the actual fiber thickness increase with the increase in extrusion speed. These observations imply that extrusion speeds can change the geometric attributes from the specified print settings at varying degrees and may also be a factor in poor layer bonding and eventually the strength of the end-product.

In FIGS. 4A and 4B, an embodiment consisting of an ultrasonic transducer (AT024, CTS Corporation, Albuquerque, N. Mex., USA) with the central frequency of 2.25 MHz, a matching delay line made of Rexolite, and a testing equipment integrating a digitizer, a pulser/receiver board and a memory unit (ATT2010, Pharmacoustics Technologies, LLC, Potsdam, N.Y., USA), which is configured for a pulse width of 200 ns, a pulser voltage of 200V, a sampling rate of 80 MHz, an amplification gain of 0 dB, and an averaging (oversampling) rate of 512, is described. The function of a delay-line is to separate the main bang (the initial pulse) from the transducer-delay line interface reflection. In off-line characterization, an acoustic couplant gel (UltraGel II, Sonotech Inc., WA, USA) was used for increasing acoustic transmission between the test artifact and the delay-line surface. The received pulse is processed and saved as a digital waveform by using an LabVIEW interface. The acquired waveforms are then processed using MATLAB to analyze the temporal and spectral responses of the test artifacts for evaluating the wave structures of pass and stops bands in the test artifacts.

Figure 3B:
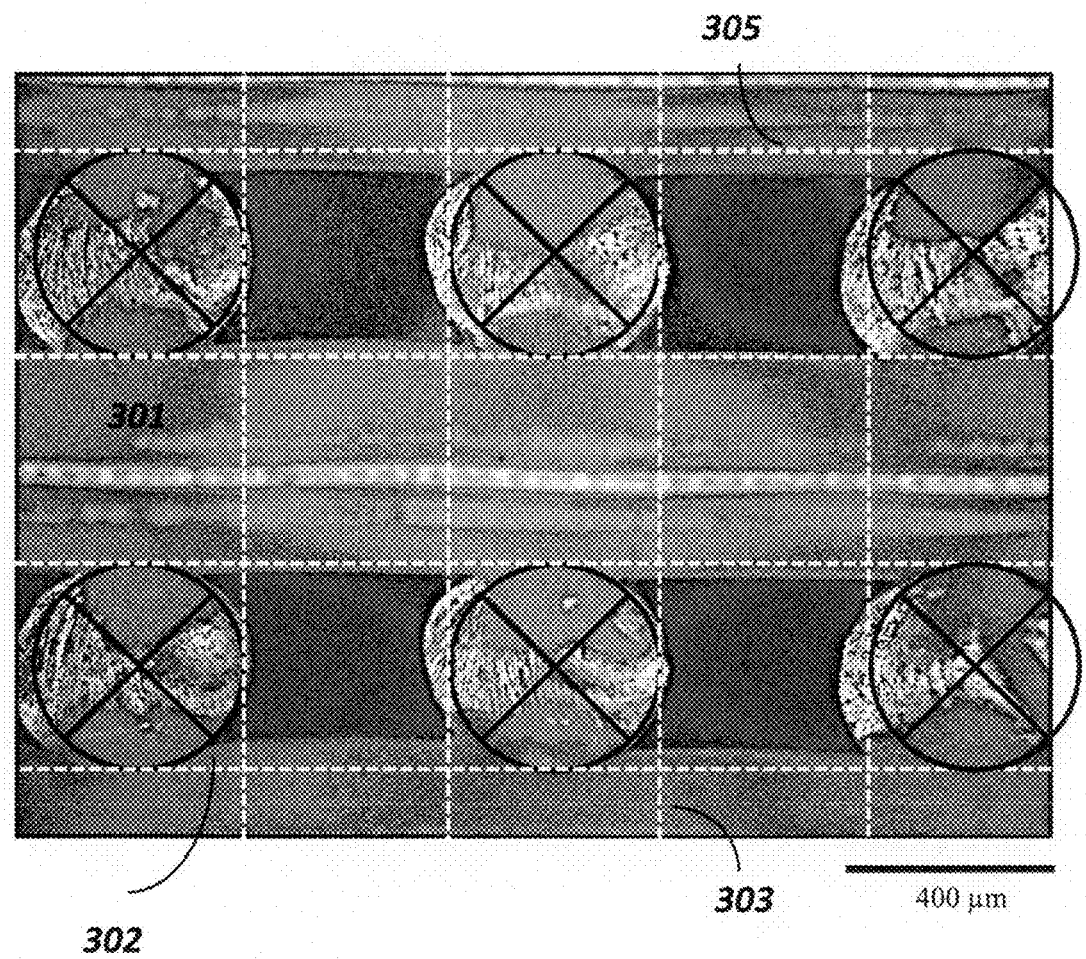
FIG. 3B is a longitudinal side view optical microscope image of an embodiment of a test artifact with a regular periodic internal structure, indicating extensive mesh deformation and bonding zone irregularities, according to one embodiment.
Figure 7:
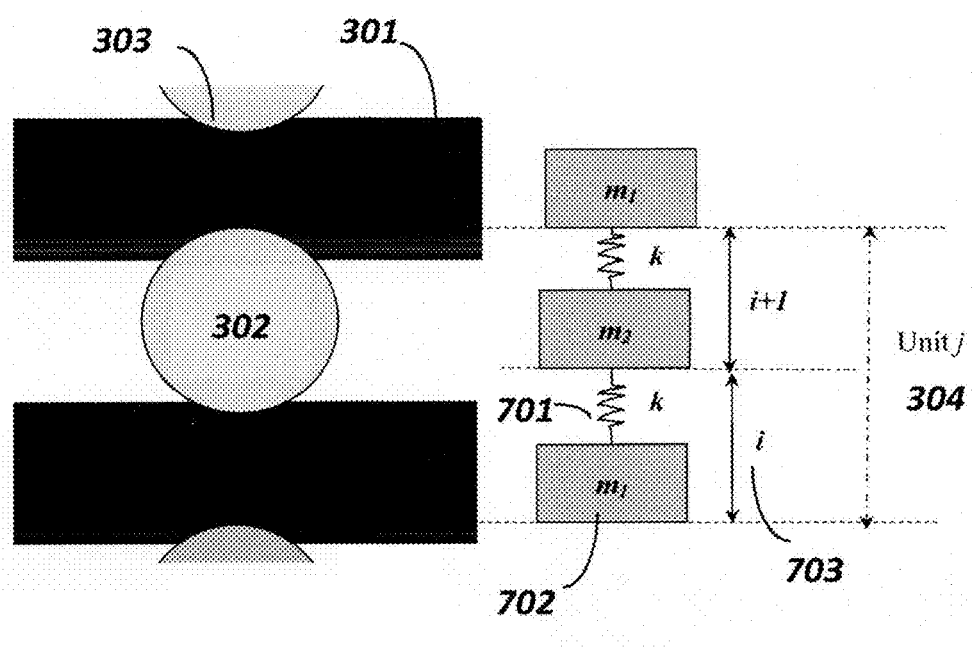
FIG. 7 is a diagram for a simple spring-mass model representing the localized elasticity of the bonding zone as a linear spring-mass system for unit j of a periodic test artifact with repeating units, according to one embodiment; and, FIG. 8 is a flowchart of a method for the overall disclosed inspection method and system, according to one embodiment.
Figure 8:
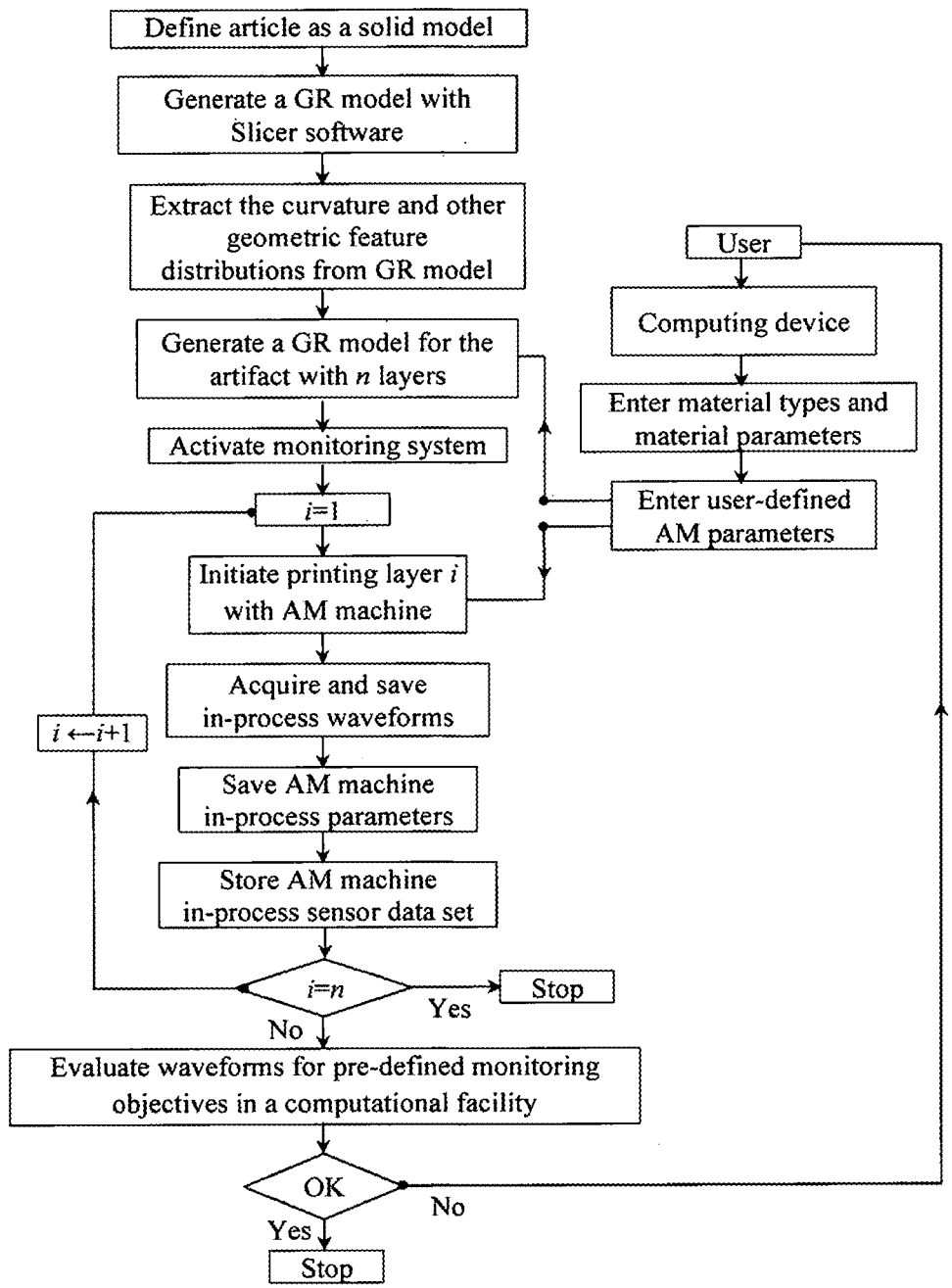

For one embodiment, each artifact in the sample set includes 10 periodic (bi-layer) units (j), each unit with two layers, leading to 20 single layers of filaments in each test artifact, as shown in FIG. 3B. For better understanding the formation of an SB following a PB, depicted in FIG. 6B, in the bandwidth of the transducer (0.72-2.3 MHz), a simple spring-mass model is introduced, as shown in FIG. 7. For a simple spring mass system, a cut-off frequency exists, and is expressed as:

$$\omega_{cut\text{-}off} = 2\sqrt{\frac{k}{m}}$$

The model is only an approximation for the periodic system under consideration especially when the wavelength is comparable to the length of unit j, as it includes no stiffness and mass variations and mass distribution. Based on FIG. 3B, the diameter of a bond zone is significantly smaller than the filament diameter, thus the bond is expected to behave more elastic. Approximating the bonding zone as an elastic disk with a diameter of 58 μm and a height of 15 μm from basic image processing of FIG. 3B, for a PLA filament with a Young's modulus of E=3.5 GPa and a mass density of ρ=1300 kg/m³, the spring stiffness of the bond and the unit i mass in the model, as depicted in FIG. 7, are approximated stiffness 701 as k=3.23×10⁶ N/m and mass 702 m=0.13×10⁻⁶ kg for sub-unit i 703 in one embodiment. The resulting cut-off frequency is $\omega_{cut\text{-}off}$=9.97×106 rd/sec (1.59 MHz). While the SB is close to the cut-off frequency, the model provided no SB similar to one formed between the boundaries (centered around 1.45 MHz) of the two subsequent PBs in FIG. 6B, indicating other wave propagation mechanisms are in play. The formation of this stop band may be attributed to three possible mechanisms: (i) continuous elastic behavior of materials leads to a more complex pass/stop band structures, (ii) defects in fusing (in bonding zones) cause additional stop bands, and (iii) existence of additional degrees of freedom in the model in the frequency spectrum of interest.

For one embodiment, for selected Print Layers $N_s$=03, 05, 08, 10, 11 and 13, ToFs were calculated to be Δt=2.06, 2.96, 5.63, 8.46, 11.33 and 13.52 μsec, respectively. The calculated ToFs were multiplied with the speed of pressure waves ($c_L$=536.51 m/s) to obtain the thicknesses of these Print Layers (1.1, 1.59, 3.02, 4.53, 6.07 and 7.24 mm, respectively). The calculated thicknesses of the print layers ($N_s$) are then divided by Print Layer height (400 μm) to obtain the expected layer number ($N_e$) ($N_e$=2.75 (~3), 4, 7.55 (~8), 11.325 (~11), 15.175 (~15) and 18.1 (~18), respectively). The expected layers, $N_e$=2.75 (~3), 4, 7.55 (~8) and 11.325 (~11) are close to their corresponding $N_s$ (03, 05, 08 and 10) layers. Reflections of the mixing points for few layers (e.g., 03, 05, 08 and 10) are the actual reflections corresponding to the respective Print Layers.

The system, method, and device of the present invention therefore, using a test artifact designed and monitored by the disclosed ways and manners, provide an indicator that can be utilized to identify abnormalities in system operation so that they may be addressed before defects occur in articles, or at least before the entire manufacturing cycle is run. Accordingly, wasting of machine capacity due to simple manufacturing errors can be minimized.

Moreover, a statistical process is able to capture trends in the manufacturing process so that the system can have predictive quality, leading to preventive maintenance.

In addition to the above, the real-time feedback provided by the present invention may enable additional additive manufacturing applications where they may currently be cost prohibited because of low yields.

While the embodiments of the present invention described above refer to printing speed and FDM, the present invention is not so limited in this regard. In particular, it is contemplated that other AM methods and materials may be utilized to provide real-time feedback and closed loop control of the manufacturing process.

While the embodiments of the present invention described above refer to a process parameter in a specific AM technique, the present invention is not so limited in this regard. In particular, it is contemplated that other process parameters and their abnormalities in the same or other AM techniques may be utilized to provide real-time feedback and closed loop control of the manufacturing process.

While the embodiments of the present invention described above refer to the formation of pass and stop bands in spectral domain as a sensing mechanism, the present invention is not so limited in this regard. In particular, it is contemplated that other features in temporal and spectral domain involved with the same or other AM methods may be utilized to provide real-time feedback and closed loop control of the manufacturing process.

In one embodiment, a test artifact in FIG. 2A is sized according to a wavelength argument. Moreover, while the embodiments of the invention described above disclose the use of a test artifact with periodic internal structures that are of a regular grid structure, it is contemplated that other periodic structures may be utilized for interrogating the test artifact for specific properties linked to desired monitoring objectives. The development of such pre-defined monitoring objectives is often based on artifact geometries, the process parameters and specification of AM machines, materials used in the print job, the data analysis of previous print jobs and heuristics of human experts. In particular, in an embodiment, an internal structure may be utilized to provide effect of the radius of curvatures in the article and the response of the AM machine to such features. In other embodiments, layer-to-layer fiber offsets and crossing properties may be taken into consideration in the artifact design. In other embodiments, one or more of these factors are automatically taken into consideration using a computer program product based on one or more deterministic algorithms. In other embodiments, a computer program product may take advantage of Machine Learning algorithms in linking observed characteristics to desired monitoring objectives for developing specific test artifacts. In other embodiments, in designing test artifacts, a computer program product may work with a human operator interacting with one or more computer program products based on one or more deterministic and Machine Learning algorithms.

In an embodiment, a method of process control for an additive manufacturing system is provided. The method includes the steps of monitoring a test artifact created during manufacture, capturing at least one waveform, deriving data from the at least one waveform, feeding the waveform data into the statistical process control module of an additive manufacturing machine, and generating an alert if the waveform data exceeds pre-determined control limits. In an embodiment, the step of monitoring the test artifact occurs in real-time. In an embodiment, the waveform data are obtained for at least one of available bonding mechanisms, material types, and process control laws. In an embodiment, the method may also include the step of, in response to the alert, taking a corrective action. In an embodiment, the corrective action may include pausing operation of the system and calibrating, adjusting or replacing a component of the system, and resuming operation. In an embodiment, the corrective action includes removing the component from the system and initiating a new cycle. In an embodiment, the steps of monitoring the test artifact and capturing at least one waveform of the test artifact are carried out by a high repetition rate pulser/receive unit.

In an embodiment, the powder material is a metal powder. In an embodiment, material is glass. In an embodiment, material is silica. In an embodiment, the glass material is a glass powder. In an embodiment, the silica material is a silica powder. In another embodiment, a material in a wire format is source material to an AM machine. In another embodiment, several different materials are utilized in a monitoring event.

In an embodiment, a transducer and a pulser/received unit with a beam formation functionality as well as supporting hardware and software are utilized. Beam formation allows focusing wave energy at a particular zone of the test artifact, allowing scanning of the interior of the test artifact, or examining particular zones of interest in a test artifact during manufacture. In an embodiment; the particular zones of interest would be bonding zones and connection points.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Those skilled in the art will recognize improvements and modifications to the preferred embodiments of the disclosure. All such improvements and modifications are considered within the scope of the concepts disclosed herein and the claims that follow.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Such modifications may, for example, involve using a different source of melting energy. Other materials than metallic powder or wires may be used, such as powder of polymers, powder of ceramics, powder of glass, and powder of silica. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for inspecting and monitoring a test artifact, comprising:
    a computing device comprising:
        a memory unit,
        a storage medium,
        a computer processor in connection with the memory unit and the storage medium that are readable and writable by the computer processor;
        a set of software instructions, disposed on the memory unit, which, when executed by the computer processor, cause the computing device to perform computational and data exchange tasks and directing data and information flow in the system; and
        at least one networking port for external communications;
    at least one transducer generating and sensing elastic waves;
    at least one wave delay line causing time delays in travelling elastic waves;
    a pulser/receiver unit generating and receiving electric signals corresponding to elastic waves;
    a digitizer unit;
    a communication utility for networking two or more inspecting and monitoring systems, additive manufacturing machines, and computing devices;
    a graphical user interface that provides an operator with real-time communication with the computing device and a warning and messaging software utility; and
    a port for mounting the system to an additive manufacturing machine,
    the test artifact with, geometric features configured to cause elastic waves incident thereon to undergo dispersion such that a set of pass and stop bands in its reflectance or transmittance spectrum has a predetermined relationship with one or more of the following:

the operational process parameters of the additive manufacturing machine, the level of deviations of the technical product specifications of an article made by the additive manufacturing machine under identical processing conditions, the levels of deviations of the technical specifications of the materials utilized, and the type and levels of defects and print errors in the test artifact.

2. The system of claim 1, wherein: the computing device may be in real-time communications with one or more of the following: a local computing facility with a communication utility for networking, a networked remote computing facility, at least one networked additional additive manufacturing machine, and a networked cloud-based computing facility.

3. The system of claim 1, further comprising,
a wireless communication utility for data exchange among computing facilities, computing devices, and additive manufacturing machines.

4. The system of claim 1, wherein
the computing device is further configured to provide an operator and control units of additive manufacturing machines with real-time process, materials and machine state information to enable the control operations and operational functions of the system.

5. The system of claim 1, wherein the computing device may store a set of pre-defined process monitoring objectives, process data and waveforms acquired for artifacts.

6. The system according to claim 1, wherein the test artifact comprises one or more of the following portions:
a portion that consists of a waves propagation surface or medium of repeating periodic sub-structures;
a portion that consists of a surface configured to mount the artifact to another surface;
a portion that serves as a delay line; and
a portion that consists of structural elements that support other portions.

7. The system according to claim 1, wherein the computing device:
executes the monitoring tasks in real-time in-situ;
takes one or more of the following corrective actions, in response to real-time alerting signals:
adjusts the process parameters of the additive manufacturing machine in real-time, replacing at least one component of the additive manufacturing machine, changing source materials and initiating a new manufacturing cycle.

8. The system according to claim 1, wherein the computing device:
tests a test artifact after production by causing the at least one transducer to irradiate said test artifact with elastic waves and sense resulting transmitted or reflected elastic waves; and determines, based on acquired waveforms, one or more of the following: the operational process parameters of the additive manufacturing machine, the level of deviations of the technical product specifications of an article made by the additive manufacturing machine under identical processing conditions, the levels of deviations of the technical specifications of the materials utilized, and the type and levels of defects and print errors in the test artifact.

9. The system according to claim 1, wherein the computing device;
designs a test artifact or artifacts in accordance with a set of user-defined testing and monitoring objectives based on the technical product specifications of an article to be manufactured, its geometric representation for the additive manufacturing machine, its material or materials, its additive manufacturing process parameters, its post-processing requirements, and its acceptable levels of engineering tolerances for all these parameters; and
modifies and enhance the design of a test article for building the test artifact as an integral part of the article to be manufactured.

10. The system of claim 1, wherein the computing device:
stores a set of pre-determined control limits specified by an operator;
compares the properties of acquired waveforms to the set of pre-determined control limits;
provides data and information to a control system of the additive manufacturing machine in real-time; and
generates real-time control actions, warnings and messages according to a set of rules included in the computing device.

* * * * *